United States Patent [19]
Ballu

[11] Patent Number: 5,478,013
[45] Date of Patent: Dec. 26, 1995

[54] DEVICE FOR MONITORING AN AGRICULTURAL SPRAYING IMPLEMENT

[75] Inventor: Patrick J.-M. Ballu, Reims, France

[73] Assignee: Tecnoma, Epernay, France

[21] Appl. No.: 219,526

[22] Filed: Mar. 29, 1994

[30] Foreign Application Priority Data

Mar. 31, 1993 [FR] France ................................. 93 03754
Jan. 3, 1994 [FR] France ................................. 94 00011

[51] Int. Cl.[6] ............................ B67D 5/06; A01C 23/00
[52] U.S. Cl. ........................................ 239/71; 239/172
[58] Field of Search ........................................ 239/172, 71

[56] References Cited

U.S. PATENT DOCUMENTS

| | | | |
|---|---|---|---|
| 3,612,356 | 10/1971 | McVey | 239/172 X |
| 3,836,078 | 9/1974 | Olson et al. | 239/71 X |
| 4,052,003 | 10/1977 | Steffen | 239/71 |
| 4,121,767 | 10/1978 | Jensen | 239/71 |
| 4,220,998 | 9/1980 | Kays | 239/172 X |
| 4,467,961 | 8/1984 | Coffee et al. | 239/71 X |
| 4,530,463 | 7/1985 | Hiniker et al. | 239/71 |
| 4,553,702 | 11/1985 | Coffee et al. | 239/172 X |
| 4,629,164 | 12/1986 | Sommerville | 239/71 X |
| 4,803,626 | 2/1989 | Bachman et al. | 239/172 X |
| 4,817,870 | 4/1989 | Dalton | 239/172 X |
| 4,878,598 | 11/1989 | Ruschhaupt, Jr. | 239/172 X |
| 4,967,957 | 11/1990 | Bachman | 239/71 X |
| 5,014,914 | 5/1991 | Wallenås | 239/172 X |
| 5,310,113 | 5/1994 | Cowgur | 239/172 X |

FOREIGN PATENT DOCUMENTS

| | | |
|---|---|---|
| 0086061 | 8/1983 | European Pat. Off. . |
| 0458107 | 11/1991 | European Pat. Off. . |
| 1066515 | 1/1984 | U.S.S.R. ......................... 239/172 |

*Primary Examiner*—Andres Kashnikow
*Assistant Examiner*—Lesley D. Morris
*Attorney, Agent, or Firm*—Watson, Cole, Grindle & Watson

[57] ABSTRACT

A vehicle, equipped with the usual spray equipment and with a casing for controlling spraying, placed in the driver's cab, is furthermore equipped, according to the invention, with a monitoring member (8) which compares the current situation of the various elements of the equipment with the normal situation of these elements for an operation prior or subsequent to spraying, this operation being displayed on the monitoring member. The operator is informed by luminous or acoustic signals whether or not it is possible to carry out the operation displayed, and of the elements on which he may have to act manually in order to render this operation possible.

8 Claims, 4 Drawing Sheets

DEVICE FOR MONITORING AN AGRICULTURAL SPRAYING IMPLEMENT

The present invention relates to a mobile agricultural spray implement provided with a control assembly.

Conventionally, an agricultural spray device comprises a spray tank, at least one pump for this liquid, and a boom with two arms, divided into several lengths equipped with sprays, and means for folding or unfolding lengths, as well as means for adjusting the height and inclination of the boom, these elements being carried by a tractor and/or by a trailer hitched to a tractor.

Such an implement is driven from a driving position equipped with conventional means for controlling the displacement of the vehicle: steering wheel, brake and accelerator pedals etc. . . . and, in addition, with a control box for controlling spraying, placed in the driver's cab of the tractor. This control box is complicated. By way of example, such a box, as currently marketed, includes in total:

a potentiometer for adjusting the volume/ha desired, eight switches controlling spraying per length of boom, eight indicators, each one associated with one of the eight switches, a six-position switch controlling the pumps and the spraying of the boom, four switches for locking the boom, and for partially or totally deploying or folding the boom arms, a switch for adjusting the height of the boom, three switches for adjusting the inclination and slant of the boom arms, two screens for displaying the desired or actual volume/ha, with control knob, and for displaying speed of advancement, three indicators for monitoring the various functions, an acoustical arm.

A similar control box is described in EP-A-0458107.

By virtue of such control boxes, the operator can best monitor spraying, and only those operations which are carried out before or after spraying proper require manual, nonremote-controlled operations, and particularly the opening and closing of valves.

The operations in preparation for spraying comprise, in particular, the filling of the spray tank with water, the incorporation of a treatment product into the contents of the tank, after or during filling, and the maintaining of stirring in the spray tank in order to prevent sedimentation during a journey.

In a conventional spray device, this is done using a circulation pump and a treatment product hopper, with a three-way valve which allows the liquid delivered by the pump to be sent either toward the top part of the spray tank or toward its bottom part, a second three-way valve which makes it possible to connect the intake of the pump either to external intake pipework or to the bottom part of the spray tank, and two two-way valves placed respectively on the pipe connecting the delivery from the pump to the bottom part of the spray tank and between this pipe and the treatment product hopper.

After spraying, rinsing of the equipment is obtained by making the liquid coming from a rinsing tank or external container pass through the spray tank, the pipes and the nozzles, which requires at least one more valve yet.

All these valves are controlled manually with, consequently, risks of a wrong move. The operator, in effect, has to check not only the position of the valves, but also the flows, the degrees to which the tanks and the hopper are full, etc., in order to avoid the formation of foam, pumping-up, excess pressure, overflowing, draining of the pump, overloads of the driving equipment, decantation, incomplete mixtures, etc.

Other elements of equipment generally exist, such as a spray tank stirrer, an auxiliary pump, drain valves, etc., and it is appropriate to make sure that they are working correctly or are in the correct position, or to make sure that two pieces of equipment are not started up when they should not operate simultaneously, etc.

Document EP-A-0086061 proposes a system which provides a solution to some of these problems.

According to this system, removable containers are filled at the workshop with a treatment product or with a dilutant, they are mounted on the implement and each connected up to a pump which is specific to that container. An onboard computer controls the pump in order to send the contents from a chosen container to the sprays, through a common circuit. At the end of spraying, the common circuit is rinsed with the dilutant, and the containers are disconnected and return to the workshop.

The operations to be carried out before and after spraying on the implement are confined to handling of containers and to rinsing of a part of the fluid circuit.

This system requires a specially equipped workshop with return of the implement to this workshop each time a container is empty. Furthermore, it is ill-suited to spraying diluted products, which require voluminous containers.

The object of the present invention is to simplify the work of the operator and to minimize the risk of accidents when using an agricultural spray, whilst allowing the use of an implement of conventional type, allowing the use of diluted products, and avoiding the need for a specially equipped workshop.

In order to obtain this result, the invention provides a mobile agricultural spraying implement comprising:

a spray assembly which can be mounted on a carrying vehicle, self-propelled or towed, and includes at least one spray tank, a pump, sprays and a fluid circuit connecting the tank, the pump and the sprays together, a control assembly for monitoring the operation of the implement during a spraying operation, this control assembly comprising a control device situated in a driver's cab close to means for controlling the displacements of the carrying vehicle, and means for controlling operations prior and subsequent to spraying such as:

filling the spray tank, introducing a treatment product into the spray tank, stirring the contents of the spray tank, filling the rinsing tank, rinsing some of the elements of the spray assembly, rinsing the spray tank after use, these means including valves, possibly motors, and being equipped with sensors for informing an operator of the situation of these valves and motors, wherein it comprises a monitoring member connected to said sensors, this monitoring member including a memory capable of storing the indications of the sensors which must correspond to at least two of said operations prior or subsequent to spraying, means for displaying the nature of the operation which the operator wishes to execute, and means for informing the operator as to the agreement between the current indications from the sensors and the indications stored in memory and corresponding to the operation displayed.

The means for informing the operator may be luminous or acoustic. Thus, the operator is advised that his intended operation can be carried out without a wrong move, and he can consequently actuate the valves, motor controls or the like.

Advantageously, the display and information means are grouped together into the monitoring box, in order to facilitate the work of the operator.

Preferably, the display and information means, possibly grouped together into a monitoring box, are placed outside the driver's cab, at an easily accessible location, so that the operator does not have to get back into this cab in order to control the operations prior and subsequent to spraying, which normally take place when stationary. A repeat set may, however, be provided in the cab.

In a further improved version of the implement according to the invention:

said monitoring member is capable of remotely controlling at least some of said motors and said valves, said monitoring member includes a memory capable of storing sequences of actions corresponding to at least one of said operations prior or subsequent to spraying, said monitoring member is capable of controlling at least some of said sequences of actions as a function of an order received and of the indications of said sensors, and the monitoring member furthermore comprises a control casing, provided with means allowing an operator to order a programmed operation, and means for informing the operator of the progress of the operation and/or for signaling an anomaly to him.

Thus, the operator no longer has to go off himself to actuate a valve, a motor control, or the like, the monitoring member takes care of this and informs him of the progress of the operation.

Advantageously, the control box is combined with the monitoring box mentioned hereinabove.

Preferably, the monitoring member is capable of controlling at least one operation from the following:

filling the spray tank by transfer of liquid from outside, introducing a treatment product into the tank, stirring the contents of the spray tank, rinsing one element of those of the spray assembly: tank, pump, sprays, fluid circuit, filters, transfer of rinsing liquid from the rinsing tank to the elements of the spray assembly and in the opposite direction, transferring liquid from an element of the spray assembly to outside.

It is beneficial to make provision for the monitoring member to be capable, moreover, of controlling a transfer of liquid between two points outside the implement. This does not, here, relate specifically to an operation prior or subsequent to spraying, but in use, an advantage is to be drawn from using the pumping means of the implement for transferring, for a purpose which may be quite different, a liquid from one location to another.

Advantageously also, the monitoring member includes a programmable timer capable of controlling the automatic follow-on of some operations.

The invention will now be explained in more detail with the aid of a practical example, illustrated with the drawings, among which:

Figure 1:
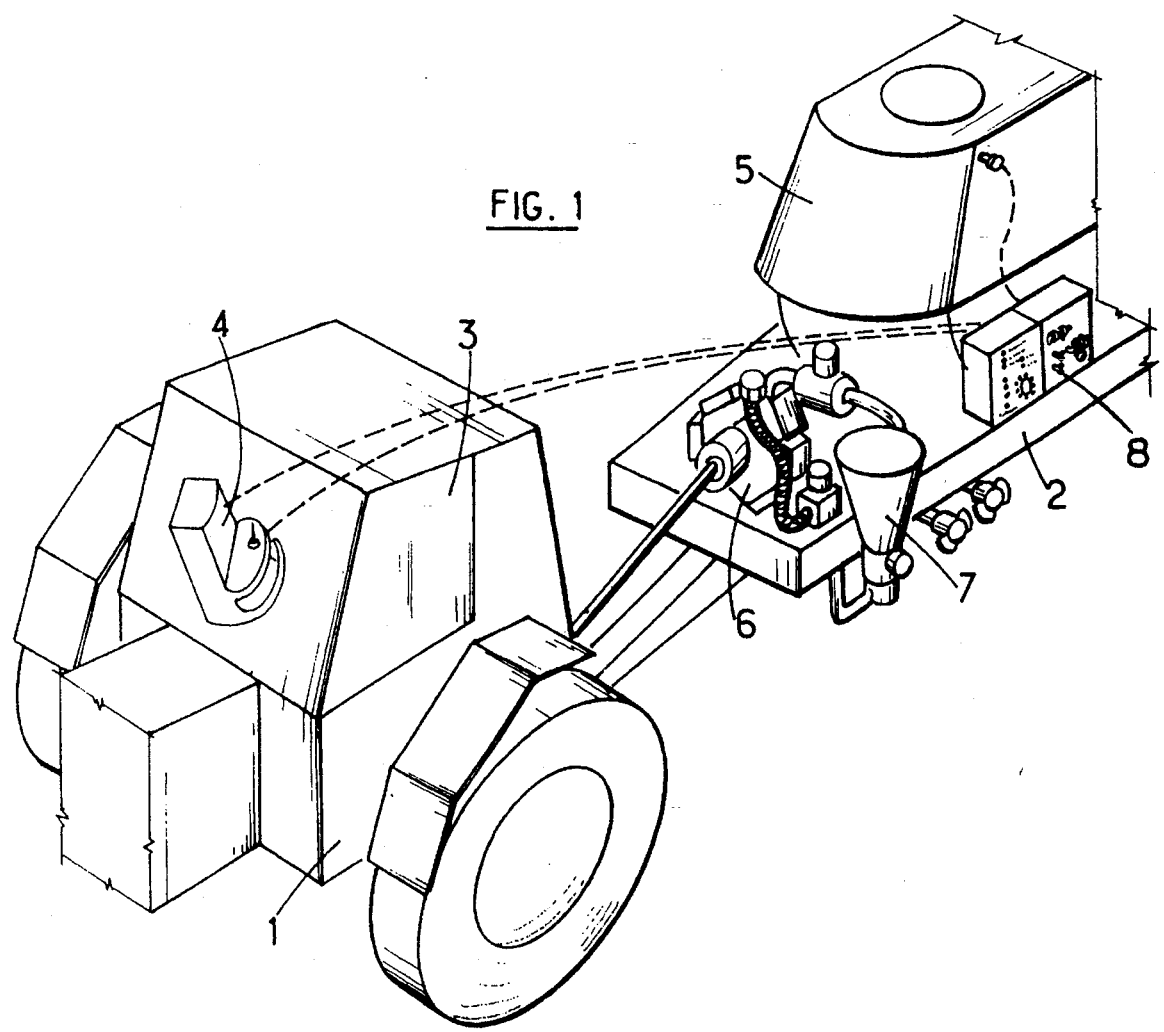
FIG. 1 is a simplified overall diagrammatic view, in perspective, of a tractor-trailer assembly equipped in accordance with the invention.

FIG. 1 shows the tractor 1, represented in part, associated with a trailer 2, also represented in part. The driver's cab 3 of the tractor contains the members for driving the tractor, which are not represented, and an assembly 4 for controlling and monitoring the spraying operations, of a type known per se, here an "Integral" from the Caruelle company.

The trailer carries a spray tank 5, visible in part, a circulation pump 6, which can send liquid from the spray tank 5 to a spray boom located to the rear and not represented. A hopper 7 for a treatment product to be incorporated into the liquid, and some of the many pipes with which the trailer is equipped have also been represented.

The trailer also carries a monitoring member 8, which is an element of the invention and will be described in more detail.

Figure 2:
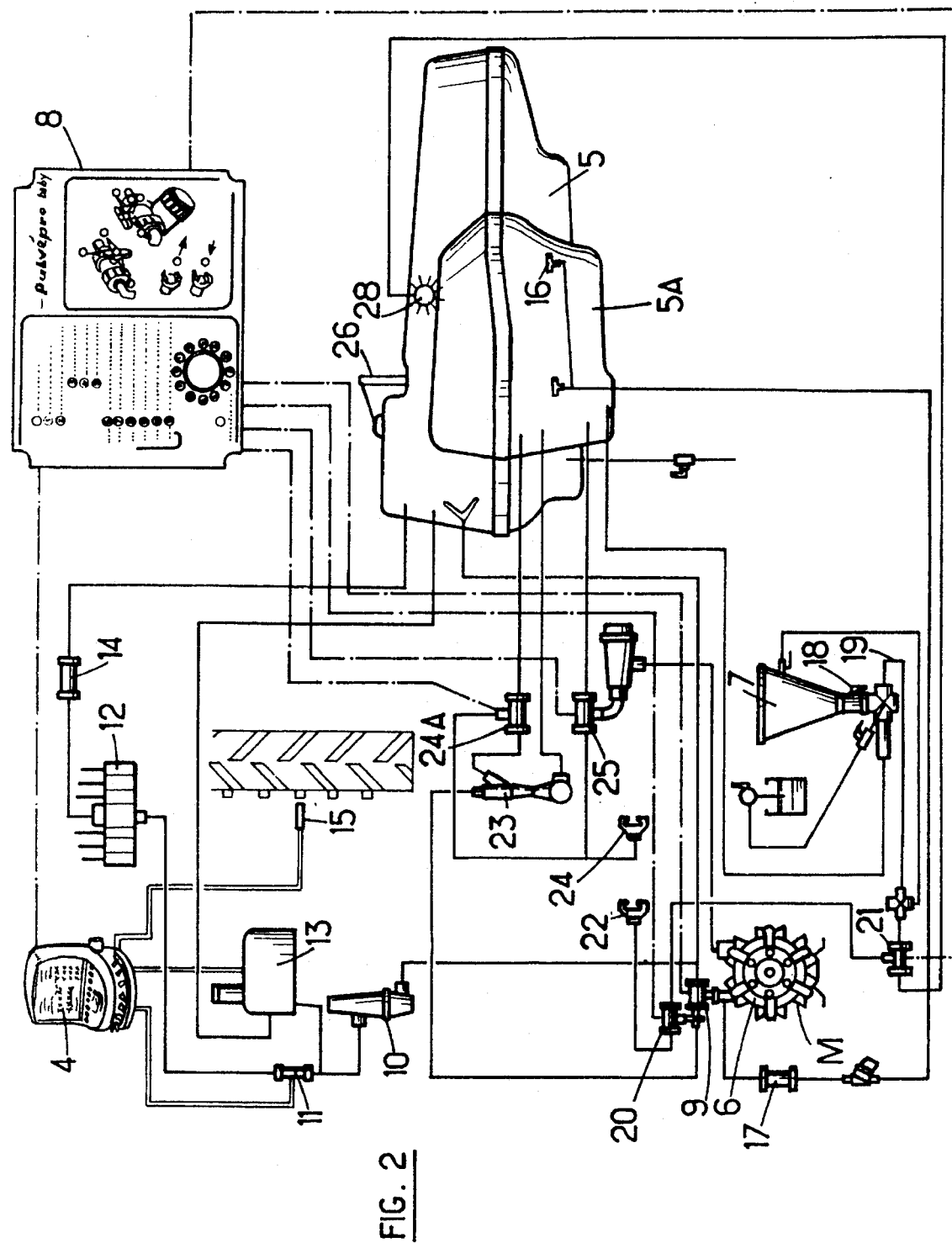
FIG. 2 is a diagram of the fluid pipes and electrical connections of the device according to the invention.

FIG. 2 is a diagram showing the elements necessary for the operations prior and subsequent to spraying, and, in double and chain line respectively, the electrical connections connecting the various elements to the control assembly 4 and to the monitoring member 8.

The spray tank 5, the pump 6 driven by motor M, and the hopper 7 for the treatment product can again be seen.

The delivery from the pump 6 includes a first three-way valve 9 for general cutoff, which connects the pump either to the spray tank 5, or to the spray booms via a filter 10, a flowmeter 11 connected to the spray control assembly 4, and an electric boom portion distributor 12, also controlled by the assembly 4. A motorized regulator 13 and a return valve 14, also controlled by the assembly 4, monitor the return of liquid to the tank 5. A tractor wheel speed sensor, also connected to the assembly 4, has been represented at 15.

The pump 6 is also connected to stirring members 16 situated in the spray tank 5, through a valve 17.

The treatment product hopper 7 is equipped with a manually controlled valve 18, which allows the treatment product to be introduced into a pipe 19 which connects the pump 6 to the spray tank 5 through the valve 9 and two other three-way valves 20 and 21, also connected to the monitoring member 8, and which allow liquid to be sent either into the pipe 19 or to a connector 22 for transfer to outside.

The delivery of the pump 6 is also connected to a water filler 23 which makes it possible to send liquid into the tank either from the spray tank itself for recirculation, or from outside through an in-line quick coupling 24 with the aid of a valve 24A. Another valve 25 makes it possible to connect the intake of the pump either to the spray tank 5 or to a rinsing tank 5A placed inside the spray tank 5. Of course, these two valves are connected to the monitoring member 8.

Reference 26 denotes a float gage which serves to signal to the monitoring member 8, the extent to which the spray tank 5 is full. Other sensors, intended particularly to signal the extent to which the rinsing tank 5A is full, the flows of liquid into the pipes, the rotational speed of the pump 6, etc., have not been represented. They are all connected to the monitoring member. Some of them, such as a maximum level detector, for example, are also connected to the spray control assembly 4.

The reference 28 denotes a device for cleaning the internal walls of the tank, with rotary jets, of the LAV'TON (trade mark) type.

The speed of the pump 6 is itself also monitored by the monitoring member 8.

The display panel of the monitoring member will now be described with reference to FIG. 3.

The reference 30 denotes a 12-position selector, the positions being intended to select the chosen function. With each of these positions there corresponds an LED 31 for displaying the chosen function. In the example described, these twelve functions are as follows:

(0) "Spray" mode (1) Cleaning the filters (2) Incorporating treatment product into the spray tank (3) Starting to fill the spray tank, (4) Filling the spray tank plus incorporation of the treatment product or products, (5) Filling the spray tank plus incorporation of the treatment product or products plus turbo, (6) Rinsing the boom, (7) Rinsing the accessories, (8) Cleaning the spray tank in a closed circuit, (9) Washing the spray tank in open circuit,

(10) Transferring from inside to outside,

(11) Transferring between two outside positions.

These functions are recalled briefly at 32, to the right of each LED 31. To the left of each LED 31, the optimal speed of the pump 6 for the function in question is recalled at 33.

The reader will understand that when the selector is in the "spray mode" position, the control assembly 4 is activated and monitors the spraying process.

Figure 4:
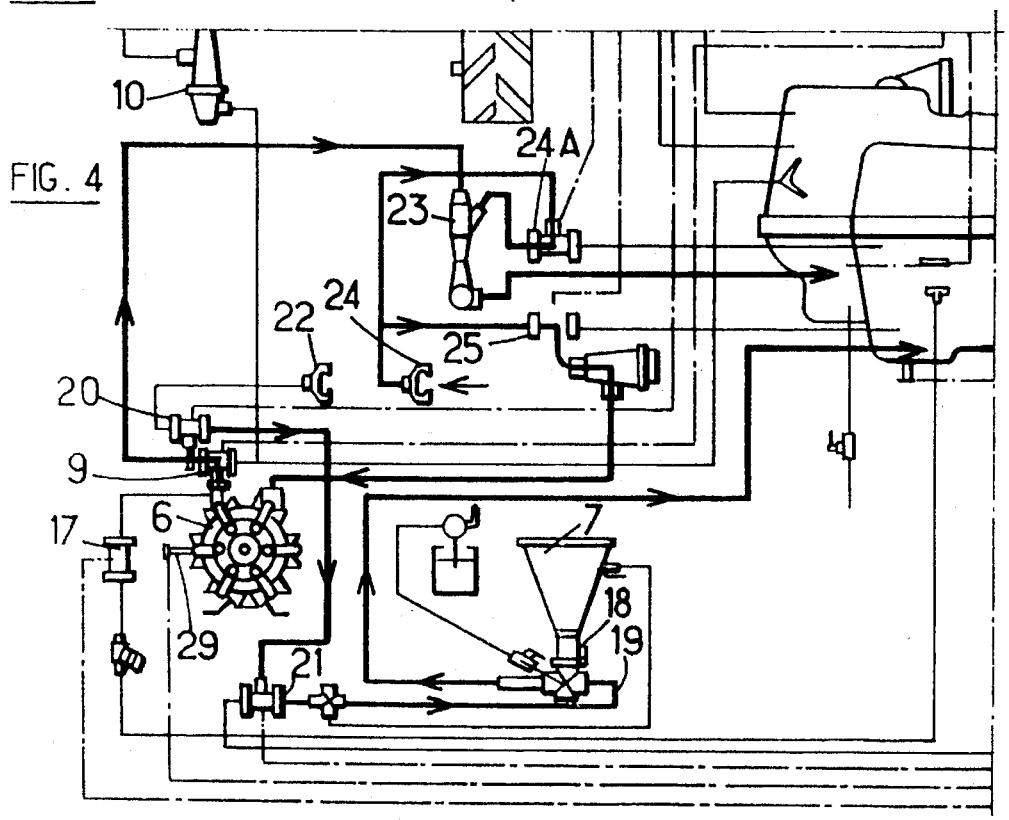
FIG. 4 is a partial diagram showing the circulation of fluids during the "filling the spray tank and priming, plus incorporation of the treatment product, plus turbo" function.

It will be noted that the description of the function No. 5 differs from that of the function No. 4 only in the addition of the words "plus turbo". This is one of the filling phases in which the spray tank is filled by the connector 24 (see FIG. 2) by means of the pump 6 with the three-way valve 25 pointing to the left and, simultaneously, by means of the water filler 23 with the valve 24A pointing to the left. By comparison with functions 3 and 4, this function 5 makes it possible to increase the filling rate by approximately 40%. The function 5 is illustrated in FIG. 4.

The reference 34 denotes an LED for validating the chosen function. The role of this diode is as follows: when a function is chosen with the aid of the selector 30, the device checks whether the manually controlled valves are actually in the position corresponding to the chosen function, and it sends control signals to the electrically controlled valves. The diode 34 is lit up only when the device has checked that all the valves are in the correct position for the chosen function.

It will be noted that some functions, such as the functions 3 to 5 or 6 to 8 may follow on automatically by virtue of a programmable timer.

The right-hand part of the front panel of the monitoring member is assigned to diagnostics.

A drawing 35 represents a three-way valve which is the valve 24A mentioned hereinabove. Three LED's 36, 37, 38 are designed to light up in order to display the situation of the valve 24A.

Another drawing 39 represents the valve 25 and is associated with three other LED's 40, 41, 42 designed to light up in order to display the situation of this valve 25.

On the same right-hand part of the front panel, a drawing 43 represents the connector 22 and it is associated with an LED 44 which lights up when this connector is connected. Likewise, a drawing 45 represents the quick coupling 24, and the associated LED 46 lights up when this connector is connected.

Figure 3:
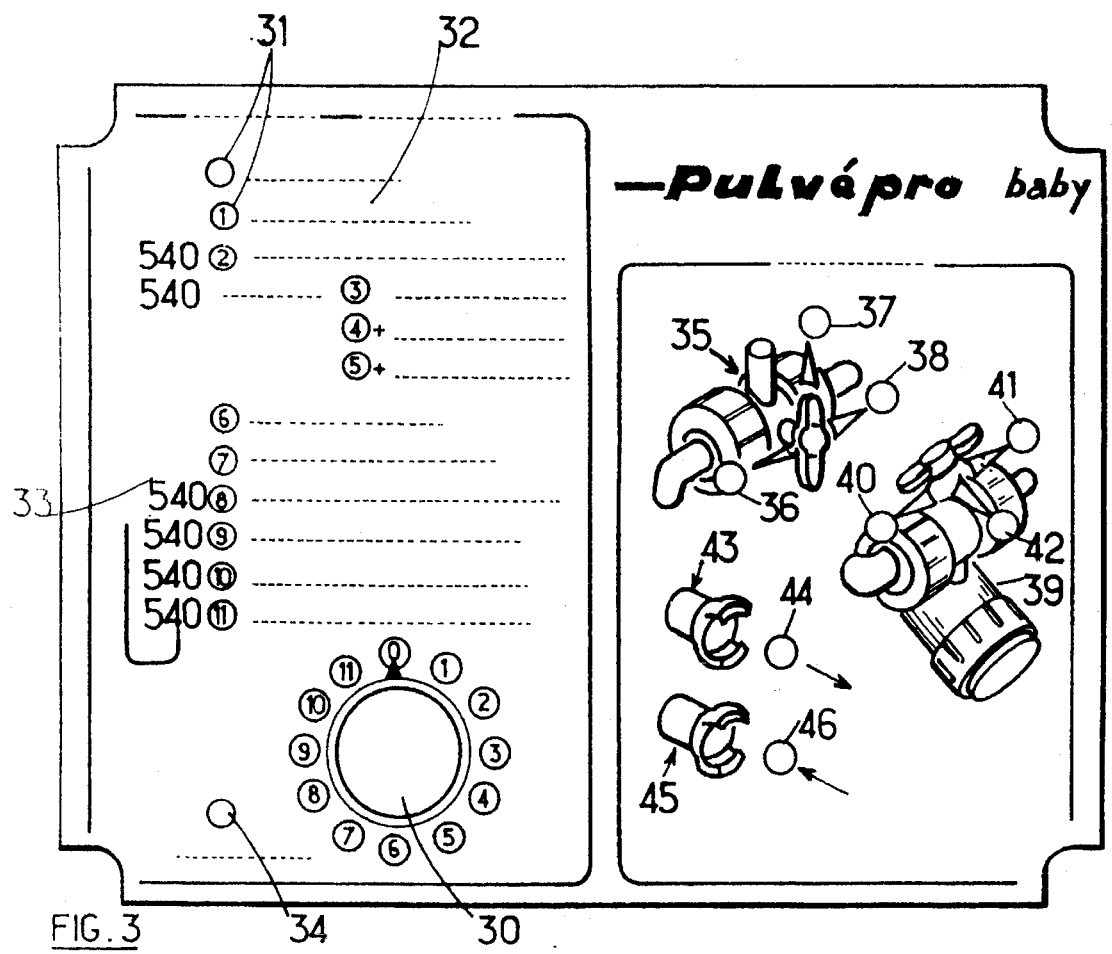
FIG. 3 is a front view of the display panel of the monitoring member.

It will be observed, by referring to FIG. 4, that if the drawings 35 and 39 are arranged as represented in this FIGURE, the LED's 38, 40 and 46 of the display panel of FIG. 3 will be lit up for the function 5, the other LED's being switched off.

Of course, it is possible, without departing from the scope of the invention, to envisage other diagnostic elements.

Likewise, the selector 30 may be designed to select functions other than those which are mentioned in the example described, either with it including more positions, or with some of the functions being replaced by others which do not feature in the list given above. Among these functions, mention may be made of:

filling the rinsing tank, rinsing the pump, rinsing the rinsing tank, stirring the spray tank, transferring liquid from the rinsing tank to outside.

It will be observed that if, instead of comprising just one spray tank, the implement comprises several of these, the selector 30, or an associated selector, could choose between several known positions, for example:

tank 1 in circuit by itself tank 2 in circuit by itself tanks 1 and 2 in circuit.

Figure 5:
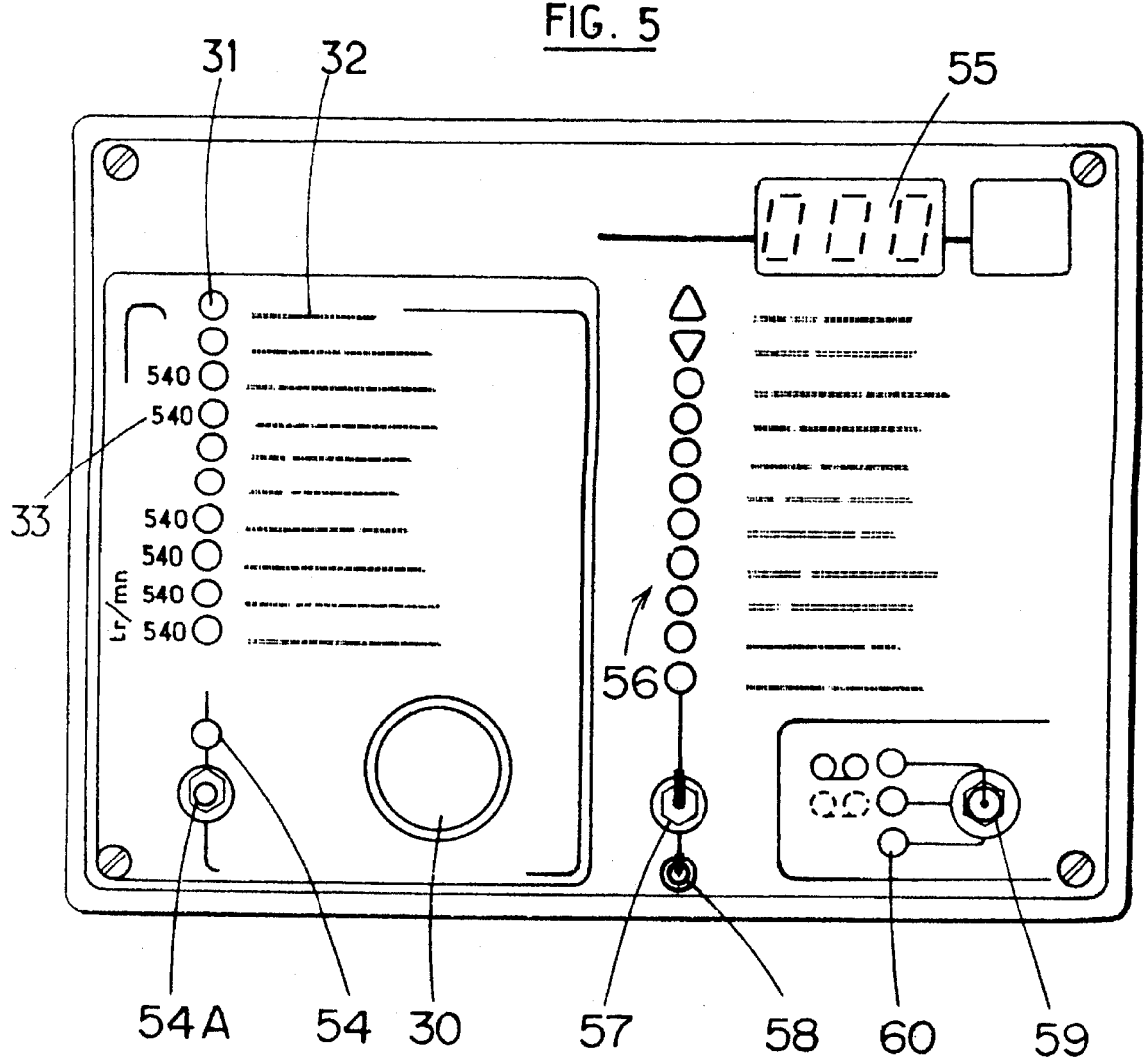
FIG. 5 is a front view of the display panel of a variant of the invention.

FIG. 5 represents the display panel of a further improved version of the implement according to the invention, in which the monitoring member 8 is capable of remotely controlling some of the motors and valves. The left-hand part of the panel closely resembles that of the panel of FIG. 3. A significant difference consists in the presence, beside the LED 54, of a validation button 54A. The LED 54 is not a validation diode, but a validation authorization diode. When the selector 30 is turned into a given position, the corresponding LED 31 starts to flash, and, if the operation is possible, the LED 54 also starts to flash. If the operation selected is impossible, for example asking for the spray tank to be filled when the gage 26 indicates that it is full, validation is impossible and the LED 54 does not light up. In order to validate a function, the operator presses on the button 54A. The corresponding LED 31 then remains continuously lit up.

It will be noted that certain functions, such as the phases of priming and turbo-filling, or rinsing of the boom, the accessories and the spray tank, may follow on automatically after each other by virtue of a programmable timer.

The right-hand part of the display panel differs, in its layout, from that of FIG. 3. This right-hand part is assigned to diagnostics and advice. A display 55 indicates the speed of the pump, provided by the sensor 29. A series of LED's 56 lights up opposite an equal number of items of information and advice, such as:

increase the speed of the pump reduce the speed of the pump engage the auxiliary pump shut down spraying spray tank full transfer liquid rinsing advisable rinsing tank empty anomaly in the valves spray tank not emptied level alarm (luminous).

The reference 57 denotes a switch for shutting down an acoustic alarm 58, which signals that the tank is full, as well as any serious anomaly. The reference 59 denotes a second three-position selector, which makes it possible to choose between the absence of stirring and two types of stirring. LED's 60 are associated with it in order to indicate the mode chosen. Of course, this selector could be eliminated if the selector 30 included a greater number of positions.

By way of example, when the function of rinsing the spray tank has been decided upon, the selector 30 is placed in the suitable position, and actuation of the button 54A automatically switches the valves into the following positions:

9:—to the left (in the FIGURE)
17:—closed
24A:—to the right
25:—to the left, and the checks and indications will be as follows:

| Checks | Indications |
| --- | --- |
| Pump speed | Increase/decrease the speed |
| Position of the valves | Valves correct/incorrect |
| Spray tank level | Spray tank full, not empty, |
| Rinsing tank level | Rinsing tank empty (buzzer) |

I claim:

1. A mobile agricultural spraying implement comprising:
   a carrying vehicle self propelled or towed,
   a spray assembly which can be mounted on the carrying vehicle and includes at least one spray tank, means for introducing a treatment product into the spray tank, a pump connected to the spray tank and a fluid circuit comprising sprays and pipes connected to the pump,
   a control assembly for monitoring operation of the implement during a spraying operation, the control assembly comprising a control device situated in a driver's cab close to means for controlling the displacement of the carrying vehicle,
   means for controlling chosen operations prior and/or subsequent to spraying, such means including valves and motors, and being equipped with means for informing an operator of the situation of these valves and motors,
   a monitoring member mounted on the carrying vehicle and connected to said controlling means, the monitoring member including a memory capable of storing indications of sensors which must correspond to the introduction of the treatment product into the spray tank and at least one of the operations prior or subsequent to spraying, chosen from among:
      the filling of the spray tank, while mounted on the carrying vehicle,
      the filling of a rinsing tank,
      the rinsing of the spray tank,
      the rinsing of the pump, and
      the rinsing of the spray fluid circuit,
   means for displaying the nature of the operation which the operator wishes to execute, and
   means for informing the operator as to the agreement between the current indications from the sensors and the indications stored in memory and corresponding to the operation displayed.

2. The implement of claim 1, in which said display and information means are grouped together into a monitoring casing.

3. The implement of claim 1, in which the display and information means are placed outside the driver's cab.

4. The implement of claim 1, in which said monitoring member is capable of remotely controlling at least some of said motors and said valves,
   said monitoring member includes a memory capable of storing sequences of actions corresponding to at least one of said operations prior or subsequent to spraying,
   said monitoring member is capable of controlling at least some of said sequences of actions as a function of an order received and of the indications of said sensors, and
   said monitoring member furthermore comprises a control casing, provided with means allowing an operator to order a programmed operation, and means for informing the operator of the progress of the operation and/or for signalling an anomaly to him.

5. The implement of claim 4, in which the control casing furthermore contains said display and information means.

6. The implement of claim 4, in which the monitoring member is capable of controlling at least one operation from the following:
   said filling the spray tank being carried out by transfer of liquid from outside,
   said introducing a treatment product into the spray tank,
   said stirring the contents of the spray tank,
   rinsing one element of those of the spray assembly: tank, pump, fluid circuit,
   transfer of rinsing liquid from the rinsing tank to the elements of the spray assembly and in the opposite direction,
   transferring liquid from an element of the spray assembly to outside.

7. The implement of claim 6, in which the monitoring member is furthermore capable of controlling a transfer of liquid between two points outside the implement.

8. The implement of claim 1, in which the monitoring member includes a programmable timer capable of controlling the automatic follow-on of some operations.

* * * * *